25805
Aug. 20, 1963　　　C. D. GOULD　　　3,101,418
ELECTRIC PROGRAMMER
Filed Aug. 14, 1961　　　　　　　2 Sheets-Sheet 1
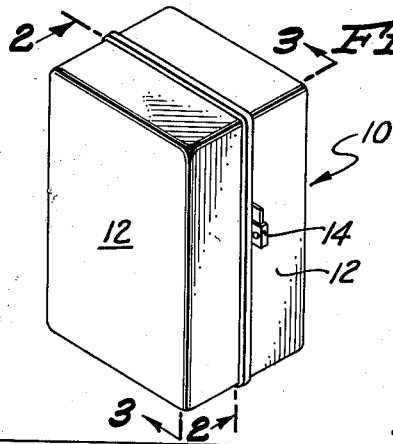
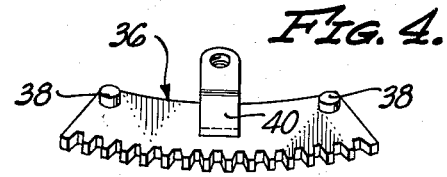
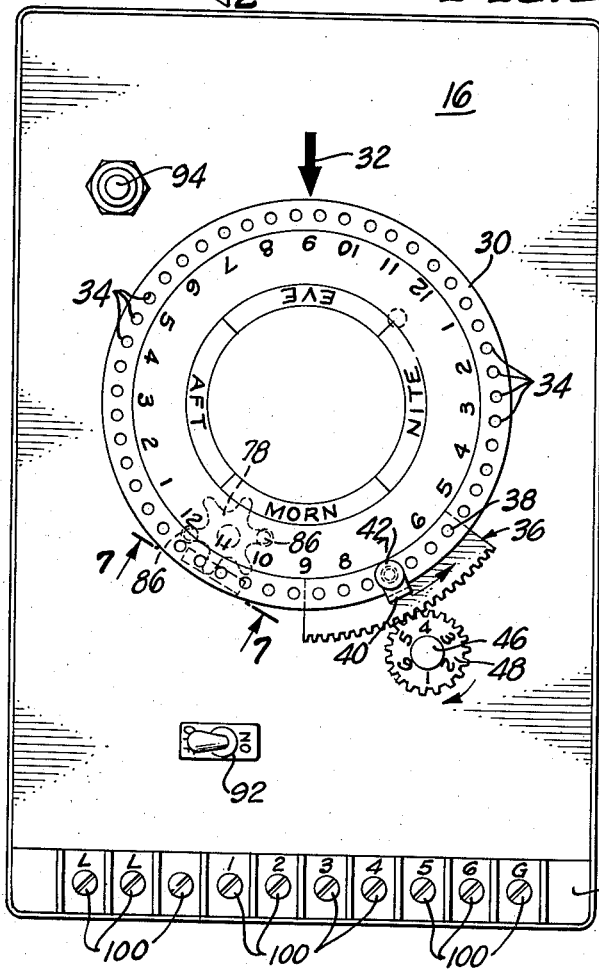
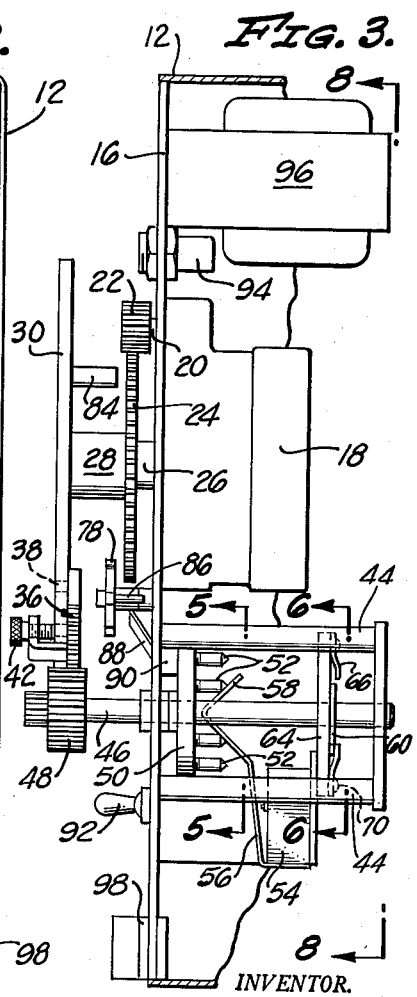
INVENTOR.
CHARLES D. GOULD
BY
O'BRIAN & BLACKHAM
ATTORNEYS

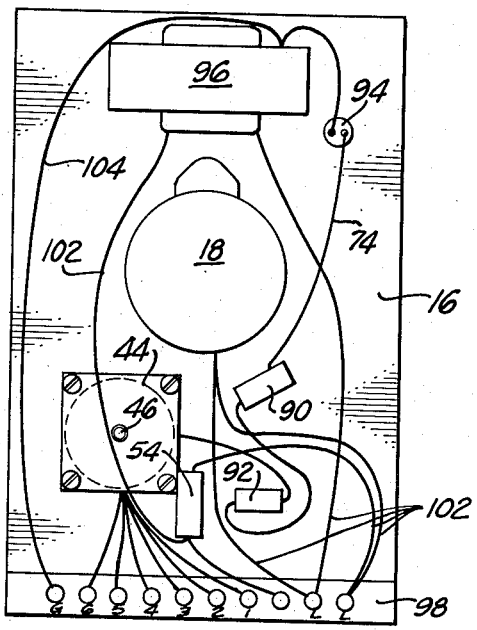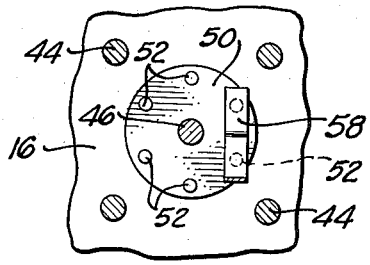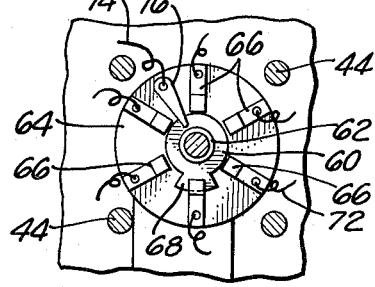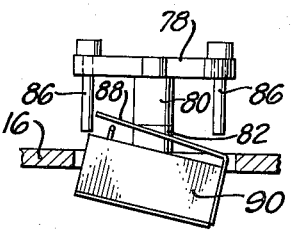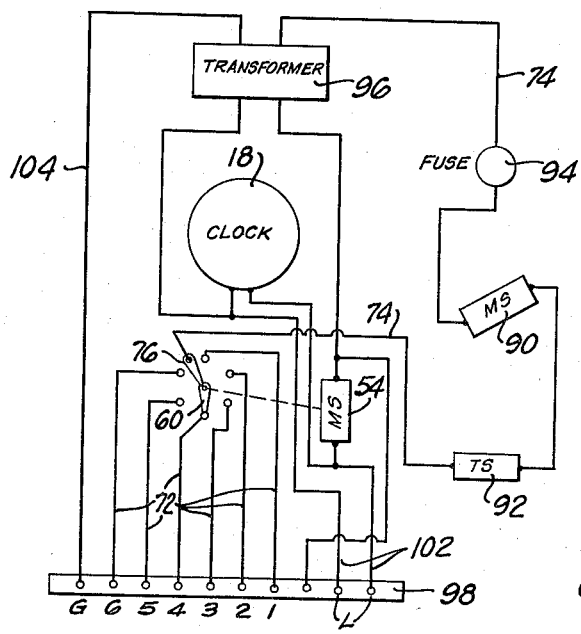

United States Patent Office 3,101,418
Patented Aug. 20, 1963

3,101,418
ELECTRIC PROGRAMMER
Charles D. Gould, Los Angeles, Calif., assignor to Richdel, Inc., North Hollywood, Calif., a corporation of California
Filed Aug. 14, 1961, Ser. No. 131,322
2 Claims. (Cl. 307—141)

This invention pertains to new and improved electric programmers.

The term "programmer" is widely used at the present time in order to designate equipment capable of being used in order to govern the operation of at least one other piece of equipment. Many different types of programmers falling within this broad definition are, of course, known. In a sense any device which actuates another device in some predetermined manner is a programmer. Many complex computing machines are capable also of being used as programmers even though they themselves are "programmed" in the broad sense of the word.

As a general rule these prior programmers have been comparatively expensive devices primarily intended so as to control other equipment with a comparatively high degree of accuracy. As a result of the constructions used in many prior programmers these prior devices have tended to be relatively complex and costly. Frequently they have been of such a character that they have been difficult to repair and service. As a consequence of these and various related factors, there has been a need for comparatively simple programmers or programming devices capable of being used in certain non-critical type applications where extreme accuracy of a programming operation is not required.

A broad object of the present invention is to satisfy this need. A related object of the present invention is to provide electric programmers which are relatively simple to construct, which are relatively inexpensive to manufacture, and which may be easily and conveniently used for a number of purposes such as for simple, controlling, electrically-operated valves of the sprinkler system. A related object of the present invention is to provide electric programmers which may be easily installed and adjusted as required for any specific application, and which may be easily serviced as required. A more specific object of the present invention is to provide a new type of switch mechanism used in an electrical programmer of this invention which is effective in order to distribute current to any of a different plurality of circuits and which is capable of being operated satisfactorily over prolonged periods.

These and other objects of this invention as well as many specific advantages of it will be more fully apparent from a detailed consideration of the remainder of this specification including the appended claims and the accompanying drawings in which:

FIG. 1 is a perspective view of a programmer of this invention with the cover of the programmer in place;

FIG. 2 is a cross-sectional view taken at line 2—2 of FIG. 1;

FIG. 3 is a partial cross-sectional view taken at line 3—3 of FIG. 1;

FIG. 4 is a perspective view of a part employed in the programmer shown in the preceding figures;

FIG. 5 is a cross-sectional view taken at line 5—5 of FIG. 3;

FIG. 6 is a cross-sectional view taken at line 6—6 of FIG. 3;

FIG. 7 is a partial cross-sectional view taken at line 7—7 of FIG. 2;

FIG. 8 is a partial cross-sectional view taken at line 8—8 of FIG. 3; and

FIG. 9 is a schematic wiring diagram showing the electrical connections within the programmer illustrated in the preceding figures.

The accompanying drawings are primarily intended so as to clearly illustrate for explanatory purposes a presently preferred embodiment or form of this invention. From a careful consideration of the drawings and the remainder of this specification it will be realized that the features of this invention set forth in the appended claims can be embodied within other differently appearing devices than the specific device illustrated in the drawings through the use or exercise of routine engineering skill or ability.

As an aid to understanding this invention it can be stated in essentially summary form that it concerns electrical programmers, each of which includes clock means employed to drive a segmental gear in order to turn a programmer shaft which carries a plurality of control bars or pins and a switch plate. Within a programmer of this type brush means are provided in order to electrically contact the switch plate in order to energize external circuits controlled by the complete programmer, and another switch means is provided which is actuated by the control bars so as to supply current to the switch plate in various predetermined positions of the programmer shaft.

The actual features of this invention and the actual nature of it will be more fully apparent from a detailed consideration of the accompanying drawings. Here there is shown a programmer 10 of this invention which includes top and bottom housing parts 12 which fit together so as to define a complete housing. These parts 12 are adapted to be secured together through conventional clips 14 at their side edges. If desired, the parts 12 may be secured together in other known manners. One of the housing parts 12 holds a mounting plate 16 which in turn supports a conventional type of clock motor 18 from which there projects a shaft 20 holding a small gear 22. This gear 22 drives another larger gear 24 which is also mounted upon a shaft 26. The shaft 26 projects for mounting purposes from the plate 16 in the motor 18. Thus with this construction the motor 18 serves to drive the shaft 26. This shaft 26 holds a conventional clutch 28 which in turn carries a gear disc 30 in such a manner that the disc 30 is normally rotated by the motor 18 in a counter-clockwise manner as it is viewed in FIG. 2 of the drawings. The clutch 28 permits the disc 30 to be rotated by hand in a clockwise manner as viewed in FIG. 2 of the drawings so as to permit this disc being set to any desired time position when the complete programmer 10 is being installed or adjusted.

From an examination of FIG. 2 it will be seen that the disc 30 carries a plurality of indicia corresponding to the conventional hour markings on a twenty-four hour clock and that a small pointer 32 is printed upon the plate 16 so as to facilitate setting of the disc 30 to any desired position. The disc 30 is provided with a plurality of equi-spaced holes 34 located around its periphery. These holes 34 correspond in spacing to various desired time periods with respect to the indicia located upon the disc 30. The holes 34 are designed so that a segmental gear 36 as illustrated in FIG. 4 of the drawings may be mounted upon the disc 30 at any desired location around its periphery. This segmental gear 36 includes projections 38 which are adapted to be located on the under-surface of the disc 30 and to fit within holes 34. It also includes a small bracket 40 which normally contains a screw 42. This screw 42 is used so as to engage a surface of the disc 30 remote from the surface engaged by the projections 38 and so as to fit against one of the holes 34 in order to securely hold the segmental gear 36 so that it is rotated as the disc 30 is rotated. The segmental gear 36 may be made any length desired so as to correspond to a given time period. Further, if desired, several additional segmental gears (not shown) corresponding to the gear 36 may be mounted upon the disc 30 as previously described.

A framework 44 is attached to the plate 16 adjacent to the motor 18. This framework 44 cooperates with the plate 16 so as to rotatably support a programmer shaft 46 which contains a terminal gear 48. This gear 48 is adapted to be engaged by the segmental gear 36 during rotation of the disc 30 so as to cause rotation of the shaft 46. Preferably the segmental gear 36 is proportioned as to dimensions with respect to the gear 48 so that the gear 48 is turned one complete turn each time it is engaged by the segmental gear 36.

The shaft 46 carries a cross-disc 50 which in turn carries a plurality of pins 52 having pointed extremities; these pins 52 preferably are spaced equidistant from the axis of the shaft 46 and are spaced equidistant from one another around the periphery of the disc 50. If desired, the pins 52 may take the form of screws which are mounted upon the disc 50 so that the amount by which they extend from this disc can be adjusted during the use of the programmer 10.

The framework 44 carries a small snap action switch 54 of conventional design capable of satisfactorily making and breaking a conventional A.C. circuit. This switch 54 is normally operated by means of an elongated resilient arm 56 having a V-shaped end 58. This end 58 is disposed so that in an "off" position of the switch 54 it rests between two of the pins 52. However, this structure is arranged so that as the shaft 46 is turned the pins will engage the arm 56 and will move this arm generally toward the switch 54, actuating this switch. As the shaft 46 continues turning from a position where the switch 54 is actuated the arm 56 will, of course, tend to move generally away from the switch 54 so that at a given, predetermined point the switch 54 will again be actuated. By varying the amount by which the pins project from the disc 50 it is possible to thus vary in the programmer 10 the duration of the time when the switch 54 is on or off, since such variation will vary the amount of contact of these pins 52 with the arm 56.

The programmer shaft 46 also carries a rotatable switch wafer 60 of metal which is insulated from the principal portion of the shaft 46 by means of an insulating bushing 62. This switch wafer 60 serves as a distribution terminal and moves generally along the surface of an insulated support 64. The support 64 carries a plurality of attached, resilient metal contacts 66 in the nature of brushes serving as circuit terminals which are adapted to engage a projecting extremity 68 of the wafer 60 as the shaft 46 is rotated. As indicated in FIG. 3 of the drawings these brushes 66 may be mounted by means of screws 70 upon the support 64. These same screws 70 may be used in order to connect various wires 72 as hereinafter described. Normally current is supplied to the switch wafer 60 by means of other wire 74 which carries a brush 76 similar to the brushes 66 so as to secure this brush to the support 64. From an examination of FIG. 6 of the drawings it will be realized that the brush 76 engages the central portion of the switch wafer 60 which is disposed around the shaft 46, and is used to supply power to the switch wafer 60 so that such power can be distributed to the brushes 66 as the programmer 10 operates. It will also be realized that the wafer 60, the support 64 and the various parts used with these parts constitute a rotary distribution switch.

The programmer 10 also includes a star wheel 78 which is mounted upon a shaft 80 which is rotatably secured by bearing 82 to the plate 16. This star wheel 78 is adapted to be rotated a fraction of a turn once each time the disc 30 is rotated by engagement with a pin 84 secured to the disc 30. In a sense the pin 84 and the wheel 78 operate in essentially a Geneva-cross type of manner. The wheel 78 may carry one or more dependent pins 86 which are adapted to engage an actuating arm 88 upon a switch 90 of a conventional design which is mounted upon the plate 16.

This plate 16 also holds a conventional on and off snap action switch 92 used in controlling the operation of the entire programmer 10, a fuse 94 employed for safety purposes, a voltage reducing transformer 96 and a terminal bar 98 of conventional design which holds various screws 100 which are employed in connecting the programmer 10 as it is used to a source of electric current and to various external circuits which are actuated by this programmer.

From an examination of FIG. 9 of the drawings it will be seen that two of the screws marked "L" are employed with the programmer 10 in order to supply line current such as in a 110 volt 60-cycle A.C. current to wires 102 which connect the motor 18 in parallel with the transformer 96 and that the switch 54 is located in series in the branch of the power circuit used to supply power to this transformer 96. One wire 104 from the transformer 96 is connected directly to the terminal marked "G" whereas the other wire 74 from the transformer 96 is used to supply power to the brush 76. The fuse 94, the switch 92 and the switch 90 are all connected in series by this wire 74. The wires 72 connected to various of the brushes 66 are directly connected to various terminals 1 through 6 in FIG. 9 of the drawings corresponding to terminals of external circuits controlled by the programmer 10.

During the use of this programmer all of the external circuits are, of course, connected to the terminal G and each of them is connected to one or more of the various terminals 1 through 6. When the switch 92 is in an "on" position and when the star wheel 78 is in a position where the pin 86 depresses the arm 88 of this switch 90 the entire apparatus is operated. During such operation the motor 18 turns continuously; simultaneously during this operation the switch 54 permits the flow of current only during such time as there is contact between the extremity 68 and one of the brushes 66. In other words, the switch 54 is actuated by the pins 52 so that current flows from the extremity 68 to one of the brushes 66 only during such time as there is complete contact with the extremity 68. As a consequence of this arcing which would normally pit the switch contact at the brushes 66 on the extremity 68 is prevented. This is considered to be an important result with the present invention.

From a consideration of the preceding those skilled in the art to which this invention pertains will realize that programmers as herein described can be effectively used for controlling various electrically operated pieces of equipment such as, for example, valves. They will further realize that these programmers may be easily and conveniently constructed at a comparatively nominal cost using a large number of readily available commercial stock parts. It will, of course, be further realized that these units are exceedingly reliable and are capable of being satisfactorily used for prolonged periods without attention. Because of these and various other factors of a similar or related character this invention is to be considered as being limited solely by the appended claims forming a part of this disclosure.

I claim:
1. An electrical programmer which includes:
mounting means, clock motor means supported by said mounting means, a gear disc connected to said clock motor means so as to be rotated thereby, a gear segment attached to the periphery of said gear disc;
a shaft rotatably mounted on said mounting means, another gear mounted on said shaft so as to be engaged by said gear segment during rotation of said gear disc in order to intermittently turn said shaft;
means mounted on said shaft for periodic actuation of a first switch, a first switch mounted on said mount- ing means, said first switch including an actuating arm arranged to be actuated by said switch actuating means during rotation of said shaft;
rotary distribution switch means having a distribution terminal coacting with a plurality of circuit terminals, one of said distribution terminals and a plurality of circuit terminals being secured to said shaft so as to rotate therewith, said coacting parts being secured to said mounting means;
a pin affixed to said gear disc, a star wheel attached to said mounting means for rotation with respect thereto, said star wheel being intermittently rotated by said pin as said gear disc rotates, a second switch mounted upon said mounting means, actuating means on said star wheel to actuate said second switch so that said second switch is actuated during one rotation of said gear disc and is non-actuated during another rotation of said gear disc;
electrical transformer means;
a terminal board including a ground connection and a plurality of individual circuit connections and terminals for supplying power to said programmer;
a first electrical conductor connected to one of said terminals for supplying power and to both said clock motor and said electrical transformer, a second electrical conductor connected to another of said terminals for supplying power and to both said first switch and said clock motor, a further electrical conductor connected to said first switch and to said transformer, an electrical conductor connected to said transformer and to said ground terminal;
a further electrical conductor serially connecting said transformer, said second switch, and said distribution terminal of said rotary distribution switch;
still further electrical conductors connecting said plurality of circuit terminals on said rotary distribution switch with said terminals on said terminal board.

2. The electrical programmer of claim 1 wherein said gear segment and said gear are of such characteristics that said shaft makes one revolution for each revolution of said gear disc, and said actuating means for said first switch is adjustable so that the period of actuation of said first switch is adjustable.

References Cited in the file of this patent

UNITED STATES PATENTS

| | | |
|---|---|---|
| 1,906,943 | Fisher et al. | May 2, 1933 |
| 2,288,019 | Newman et al. | June 30, 1942 |
| 2,661,060 | Otis | Dec. 1, 1953 |
| 2,661,401 | Jochem et al. | Dec. 1, 1953 |
| 2,790,862 | Montgomery | Apr. 30, 1957 |
| 2,977,525 | Medlar | Mar. 28, 1961 |

FOREIGN PATENTS

| | | |
|---|---|---|
| 1,031,347 | Germany | June 4, 1958 |